(12) United States Patent
Steelman et al.

(10) Patent No.: US 11,571,690 B2
(45) Date of Patent: Feb. 7, 2023

(54) CATALYST COMPLEX

(71) Applicant: Dow Global Technologies LLC, Midland, MI (US)

(72) Inventors: David K. Steelman, Angleton, TX (US); David A. Babb, Lake Jackson, TX (US); Joost Depicker, Wachtebeke (BE); Jasmijn Kuijper, Hoek (NL); Mari S. Rosen, Midland, MI (US)

(73) Assignee: Dow Global Technologies LLC, Midland, MI (US)

( * ) Notice: Subject to any disclaimer, the term of this patent is extended or adjusted under 35 U.S.C. 154(b) by 375 days.

(21) Appl. No.: 16/610,558

(22) PCT Filed: May 10, 2018

(86) PCT No.: PCT/US2018/032045
§ 371 (c)(1),
(2) Date: Nov. 4, 2019

(87) PCT Pub. No.: WO2018/209069
PCT Pub. Date: Nov. 15, 2018

(65) Prior Publication Data
US 2021/0154656 A1    May 27, 2021

Related U.S. Application Data

(60) Provisional application No. 62/504,133, filed on May 10, 2017, provisional application No. 62/504,145, filed on May 10, 2017.

(51) Int. Cl.
*B01J 37/04* (2006.01)
*B01J 23/80* (2006.01)
(Continued)

(52) U.S. Cl.
CPC .............. *B01J 37/04* (2013.01); *B01J 23/80* (2013.01); *B01J 27/26* (2013.01); *B01J 35/1009* (2013.01);
(Continued)

(58) Field of Classification Search
CPC ... B01J 37/04; B01J 37/06; B01J 37/08; B01J 37/036; B01J 23/80; B01J 27/26;
(Continued)

(56) References Cited

U.S. PATENT DOCUMENTS 3,278,457 A * 10/1966 Milgrom .............. B01J 31/1805
526/170
4,843,054 A * 6/1989 Harper .................. C08G 65/30
502/200
(Continued)

FOREIGN PATENT DOCUMENTS

EP    0222453 A    5/1987
JP    H04-351632 A    7/1992
(Continued)

OTHER PUBLICATIONS

Dienes et al., Green Chemistry vol. 14, 2012, pp. 1168-1177.
Subhani et al., Eur. J. Inorganic Chem. 2016, pp. 1944-1949.

*Primary Examiner* — Patricia L. Hailey

(57) ABSTRACT

Embodiments relate to a method of producing a modified double metal cyanide complex, a method of producing a monol or polyol that includes providing the modified double metal cyanide complex, an alkylene oxide polymerization process that includes providing the modified double metal cyanide complex, a batch, semi-batch, or continuous manufacturing process that includes providing the modified double metal cyanide complex, and a polyether polyol prepared using the batch, semi-batch, or continuous manu- (Continued)

facturing process that includes providing the modified double metal cyanide complex.

12 Claims, 2 Drawing Sheets

(51) Int. Cl.
| | | |
|---|---|---|
| *B01J 27/26* | (2006.01) | |
| *B01J 35/10* | (2006.01) | |
| *B01J 37/03* | (2006.01) | |
| *B01J 37/06* | (2006.01) | |
| *B01J 37/08* | (2006.01) | |
| *C08G 65/26* | (2006.01) | |
| *C07F 15/06* | (2006.01) | |

(52) U.S. Cl.
CPC .............. *B01J 37/036* (2013.01); *B01J 37/06* (2013.01); *B01J 37/08* (2013.01); *C07F 15/065* (2013.01); *C08G 65/269* (2013.01); *C08G 65/2663* (2013.01); *C08G 65/2693* (2013.01); *C08G 2220/00* (2013.01)

(58) Field of Classification Search
CPC ................ B01J 35/1009; C07F 15/065; C08G 65/2663; C08G 65/269; C08G 65/2693; C08G 2220/00
USPC ........................................................ 502/175
See application file for complete search history.

(56) References Cited

U.S. PATENT DOCUMENTS

| | | | | |
|---|---|---|---|---|
| 5,783,513 A | * | 7/1998 | Combs ..................... | B01J 27/26 502/200 |
| 5,952,261 A | * | 9/1999 | Combs ............... | C08G 65/2663 502/340 |
| 6,362,126 B1 | * | 3/2002 | Grosch .............. | C08G 65/2663 502/154 |
| 6,780,813 B1 | | 8/2004 | Hofmann | |
| 6,869,905 B1 | * | 3/2005 | Dexheimer ........ | C08G 65/2663 423/364 |
| 6,921,737 B1 | * | 7/2005 | Dexheimer ........ | C08G 65/2663 423/364 |
| 9,040,657 B2 | * | 5/2015 | Laitar .................... | C08G 65/34 528/412 |
| 2006/0058182 A1 | * | 3/2006 | Combs ..................... | B01J 27/26 502/159 |
| 2008/0292526 A1 | * | 11/2008 | Bohres ............... | C08G 65/2663 423/365 |
| 2010/0029961 A1 | * | 2/2010 | Triller ................ | C08G 65/2663 502/200 |
| 2013/0190462 A1 | * | 7/2013 | Wolf .................... | C08G 64/205 528/405 |
| 2019/0284051 A1 | * | 9/2019 | Nandi .................... | C10G 49/04 |
| 2021/0198425 A1 | * | 7/2021 | Steelman .............. | B01J 35/023 |
| 2022/0041807 A1 | * | 2/2022 | Babb .................. | C08G 65/2606 |

FOREIGN PATENT DOCUMENTS

| | | | | |
|---|---|---|---|---|
| WO | 01/04177 A | 1/2001 | | |
| WO | WO-0104177 A1 | * | 1/2001 | .............. B01J 27/26 |
| WO | 2012/022048 A | 2/2012 | | |
| WO | WO-2012022048 A1 | * | 2/2012 | ......... C08G 18/4866 |
| WO | 2012/091968 A | 7/2012 | | |
| WO | WO-2012091968 A1 | * | 7/2012 | ............. C07C 41/01 |
| WO | 2016/209677 A | 12/2016 | | |

* cited by examiner

CATALYST COMPLEX

This invention relates to metal catalysts useful for, among other things, polymerizing alkylene oxides and copolymerizing an alkylene oxide with a carbonate precursor such as $CO_2$.

Poly(alkylene oxides) are produced globally in large quantities by polymerizing one or more alkylene oxides in the presence of a polymerization catalyst. They are important raw materials for producing polyurethanes and are used as surfactants and industrial solvents, among other uses. The predominant polymerization catalysts are alkali metal hydroxides or alkoxides and certain metal complexes that are commonly referred to as double metal cyanide (DMC) catalysts.

Double metal cyanide catalysts have certain advantages. They do not strongly catalyze a rearrangement of propylene oxide to form propenyl alcohol. Polyether polyols made using DMC catalysts therefore tend to have lower quantities of unwanted monofunctional polymers. In addition, DMC catalyst residues usually do not need to be removed from the product. Doing so avoids neutralization and catalyst removal steps that are needed when alkali metal catalysts are used.

DMC catalysts have certain disadvantages, however. They exhibit a latency period after being exposed to an alkylene oxide under polymerization conditions before they become "activated" and rapid polymerization begins. Another significant problem is that DMC catalysts perform sluggishly in the presence of high concentrations of hydroxyl groups. For this reason, DMC catalysts are disfavored when making low molecular weight products and in semi-batch processes that begin with low equivalent weight starters.

U.S. Pat. No. 9,040,657 discloses a method of producing a polyether monol or polyol in the presence of the DMC catalyst and a magnesium, Group 3-Group 15 metal or lanthanide series compound in which a magnesium, Group 3-Group 15 metal or lanthanide series metal is bonded to at least one alkoxide, aryloxy, carboxylate, acyl, pyrophosphate, phosphate, thiophosphate, dithiophosphate, phosphate ester, thiophosphate ester, amide, siloxide, hydride, carbamate or hydrocarbon anion, and the magnesium, Group 3-Group 15 or lanthanide series metal compound being devoid of halide anions. This technology is very effective in reducing the activation time and in improving the catalyst performance when exposed to high concentrations of hydroxyl groups. However, adding the second component of the catalyst system into the polymerization reaction requires additional equipment for storing and metering. Because of the small amounts that are needed, precise control over the addition of the second component can be difficult.

Subhani et al., in *Eur. J. Inorg. Chem.* 2016, 1944-1949, describe $TiO_2$-DMC hybrid catalysts and their use in copolymerizing propylene oxide and carbon dioxide to form polycarbonates. A hybrid $SiO_2$-DMC catalyst, also for polycarbonate production, is described by Dienes et al. in *Green Chem.* 2012, 14, 1168.

U.S. Pat. No. 6,780,813 discloses a process of preparing a DMC catalyst that includes the steps of forming a DMC catalyst dispersion while using an additional piece of equipment not typically used, i.e., a jet disperser, to dispense liquid solutions of at least one water soluble salt of Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) or Cr(III); and at least one solution of at least one water-soluble metal cyanide salt or at least one alkali or alkaline-earth metal cyanide acid of Fe(II), Fe(III), Co(II), Co(III), Cr(II), Cr(III), Mn(II), Mn(III), Ir(III), Ni(II), Rh(III), Ru(II), V(IV) or V(V). Improvements are sought that enable the introduction of additives into a catalyst without the use of specialized equipment, such as jet dispersers.

This invention is in one aspect a method for producing a catalyst complex, the method comprising:

a) forming a starting solution comprising i) a solvent that includes at least one of water and a liquid aliphatic alcohol, the solvent having dissolved therein ii) a cyanometallate compound having an $M^2$ metal cyanometallate group and iii) a $M^1$ metal salt which reacts with the cyanometallate compound to form a water-insoluble $M^1$ metal cyanometallate, which starting solution further contains 0.01 to 10 moles, per mole of cyanometallate compound, of iii) at least one $M^3$ metal compound different from the $M^1$ metal salt, the $M^3$ metal compound being a compound of a $M^3$ metal which is not titanium, the $M^3$ metal being selected from one or more of magnesium, a Group 3-Group 15 metal other than titanium, or a lanthanide series metal which $M^3$ metal is bonded to at least one alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion, and the $M^3$ metal compound is devoid of halide anions;

b) reacting the cyanometallate compound and $M^1$ metal salt to form a catalyst complex that includes a water-insoluble $M^1$ metal cyanometallate, The invention is also a catalyst complex made in the foregoing process.

The invention is also a water-insoluble catalyst complex which corresponds to the formula:

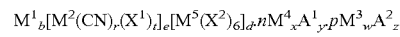

wherein:

$M^1$ and $M^4$ each represent a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;

$M^2$ and $M^5$ each represent a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Pd^{2+}$, and $Pt^{2+}$;

$M^3$ represents at least one magnesium, Group 3-Group 15 metal, or lanthanide series metal ion, excluding titanium;

$X^1$ represents a group other than cyanide that coordinates with the $M^2$ ion;

$X^2$ represents a group other than cyanide that coordinates with the $M^5$ ion;

$A^1$ represents a halide, nitrate, sulfate, carbonate, cyanide, oxalate, thiocyanate, isocyanate, perchlorate, isothiocyanate, an alkanesulfonate, an arylenesulfonate, trifluoromethanesulfonate, or a $C_{1-4}$ carboxylate;

$A^2$ represents least one alkoxide, aryloxy, carboxylate, acyl, pyrophosphate, phosphate, thiophosphate, amide, oxide, siloxide, hydride, carbamate, or hydrocarbon anion;

b, c and d are each numbers that reflect an electrostatically neutral complex, provided that b and c each are greater than zero;

x and y are integers that balance the charges in the metal salt $M^3_xA^1_y$;

r is an integer from 4 to 6;

t is an integer from 0 to 2;

n is a number from 0 to 20;

p is from 0.002 to 10; and w and z are integers that balance the charges in the metal salt $M^3_zA^2_z$, provided that w is from 1 to 4.

The invention in another aspect is a particulate, water-insoluble catalyst complex comprising hybrid particles having both an $M^1_b[M^2(CN)_r(X^1)_t]_c$ phase and an $M^3$ metal oxide phase, wherein $M^1$ represents a metal ion independently selected from $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$;

$M^2$ represents a metal ion independently selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Ni^{2+}$, $Pd^{2+}$, and $Pt^{2+}$;

$M^3$ represents at least one magnesium, Group 3-Group 15 metal, or lanthanide series metal ion, excluding titanium;

$X^1$ represents a group other than cyanide that coordinates with the $M^2$ ion;

b and c are each numbers that reflect an electrostatically neutral complex;

r is an integer from 4 to 6; and t is an integer from 0 to 2.

The invention in another aspect is a catalyst complex comprising a physical admixture of particles of a water-insoluble zinc hexacyanocobaltate with particles of an $M^3$ metal oxide, the $M^3$ metal oxide particles being present in an amount to provide 0.002 to 10 moles of $M^3$ metal per mole of cobalt provided by the zinc hexacyancobaltate, and further wherein the $M^3$ metal oxide particles have a surface area of at least 1 $m^2$/g as measured using gas sorption methods.

Catalyst complexes of the various aspects of the invention have been found to be fast-activating and perform very well even in the presence of high concentrations of hydroxyl groups. They are effectively prepared in a simplified process, e.g., such that the process avoids the use of specialized equipment such as jet dispersers, loop reactors, and/or additional feed lines. Further, the catalyst complex performs very comparably to catalyst systems described in U.S. Pat. No. 9,040,657, while avoiding the need to add additional equipment to a polyether production process for the purpose of introducing a separate additive as is the case with the process of U.S. Pat. No. 9,040,657.

Figure 1:
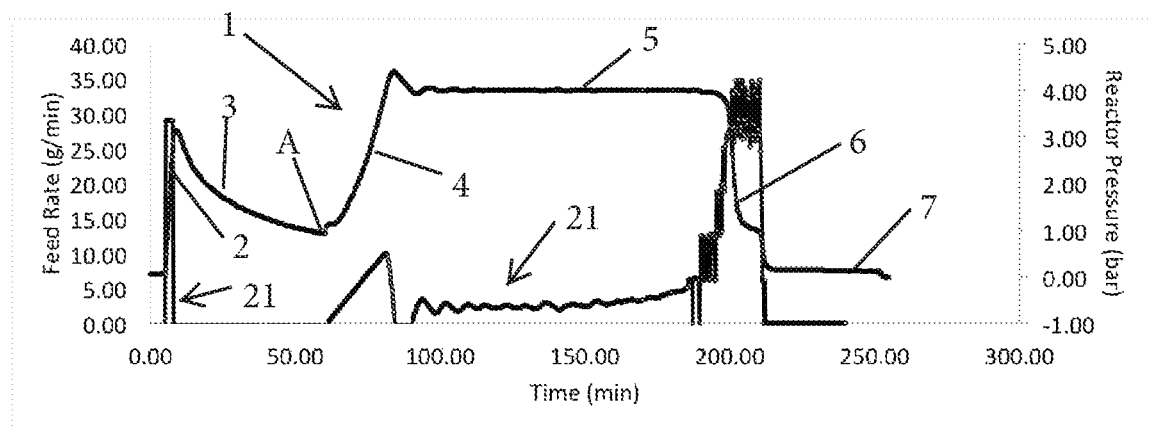
FIG. 1 illustrates a graphical representation of reactor pressure and propylene oxide feed rate vs. time for a propylene oxide polymerization using a prior art catalyst (Comparative Sample C).

Catalyst complexes in some embodiments are prepared in a precipitation process, in which a solution containing the starting materials is prepared, certain of the starting materials react and the catalyst complex precipitates from the starting solution. In general, methods for producing DMC catalyst as described, e.g., in U.S. Pat. Nos. 3,278,457, 3,278,458, 3,278,459, 3,404,109, 3,427,256, 3,427,334, 3,427,335, and 5,470,813, can be adapted to make the catalyst complex such embodiments by incorporating the $M^3$ metal compound into the starting solutions used to prepare those catalysts.

The solvent includes at least one of water and a liquid aliphatic alcohol. The solvent is one in which the starting cyanometallate compound and $M^1$ metal compound are soluble. The solvent may or may not be a solvent for the $M^3$ metal compound.

The solvent may be, for example, water, n-propanol, iso-propanol, n-butanol, sec-butanol, t-butanol, other alkylene monoalcohol having up to, for example, 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol. Aliphatic monoalcohols having 3 to 6 carbon atoms, especially t-butanol, are preferred among these. Especially preferred is a mixture of water and a liquid aliphatic alcohol that is soluble in water at the relative proportions present in the mixture (especially an aliphatic monoalcohol having 3 to 6 carbon atoms and most preferably t-butanol), in a volume ratio of 25:75 to 90:10.

The starting solution is conveniently formed by forming separate solutions of the starting cyanometallate compound and the $M^1$ metal compound and combining them. The $M^3$ metal compound is conveniently added to one or the other of these separate solutions, preferably the $M^1$ metal compound solution. The combining of the starting solution should be accompanied by mixing. It is generally preferred to mix the cyanometallate compound solution into the solution of the $M^1$ metal compound, preferably by gradually adding the cyanometallate compound solution so the $M^1$ metal compound is always present in excess.

It is preferred to provide an excess of the $M^1$ metal compound over the cyanometallate compound. In some embodiments, the mole ratio of $M^1$ metal compound to cyanometallate compound is at least 2:1, preferably at least 3:1 or at least 5:1. This ratio may be, for example, up to 20:1 or up to 15:1.

The starting solution contains, prior to reaction, 0.01 to 10 moles of the $M^3$ metal compound per mole of cyanometallate compound. Smaller amounts do not lead to any improvement in the performance of the catalyst complex. Larger amounts not only fail to improve the catalyst performance but actually tend to diminish it.

The cyanometallate compound and $M^1$ metal compound react to form a catalyst complex that includes a water-insoluble $M^1$ metal cyanometallate. This reaction proceeds spontaneously at temperatures around room temperature (23° C.) or slightly elevated temperatures. Therefore, no special reaction conditions are needed. The temperature may be, for example, from 0 to 60° C. A preferred temperature is 20 to 50° C. or 25 to 45° C. It is preferred to continue agitation until precipitation takes place, which is generally indicated by a change of appearance in the solution. The reaction pressure is not especially critical so long as the solvent does not boil off. A pressure of 10 to 10,000 kPa is suitable, with a pressure of 50 to 250 kPa being entirely suitable. The reaction time may be from 30 minutes to 24 hours or more.

In some cases, the $M^3$ metal compound may react during the catalyst preparation step. For example, certain $M^3$ metal compounds may react with water during the catalyst preparation to form the corresponding metal oxide. The $M^3$ metal compound or reaction product thereof (especially an $M^3$ metal oxide) in some embodiments forms, together with a reaction product of the $M^1$ metal compound and the cyanometallate compound, hybrid particles having both an $M^1_b[M^2(CN)_r(X^1)_t]_e$ phase and an $M^3$ metal oxide phase.

It is preferred to treat the precipitated catalyst with a complexing agent. This is conveniently done by washing the precipitated catalyst one or more times with a complexing agent or solution of the complexing agent in water. The complexing agent component may include at least one of an alcohol as described before with regard to the starting solution, a polyether, a polyester, a polycarbonate, a glycidyl ether, a glycoside, a polyhydric alcohol carboxylate, a polyalkylene glycol sorbitan ester, a bile acid or salt, a carboxylic acid ester or amide thereof, cyclodextrin, an organic phosphate, a phosphite, a phosphonate, a phosphonite, a phosphinate, a phosphinite, an ionic surface- or interface-active compound, and/or an α,β-unsaturated carboxylic acid ester. In exemplary embodiments, the organic complex agent is one or more of n-propanol, iso-propanol, n-butanol, sec-butanol, t-butanol, other alkylene monoalcohol having up to, for example, 12 carbon atoms, ethylene glycol, diethylene glycol, triethylene glycol, propylene glycol, dipropylene glycol, tripropylene glycol, or other polyether having one or more hydroxyl groups and a molecular weight of up to, for example, 8000 g/mol.

The catalyst complex so made is conveniently recovered from the starting solution or any wash liquid, dried and, if desired, ground or milled to reduce the catalyst complex to a powder having a volume average particle size of, for example, 100 μm or smaller. Drying can be performed by heating and/or applying vacuum.

The $M^1$ metal compound preferably is water-soluble. It is typically a salt of an $M^1$ metal and one or more anions. Such a salt may have the formula $M^1{}_x A^1{}_y$, wherein x, $A^1$ and y are as described before. Suitable anions Al include, but are not limited to, halides such as chloride, bromide and iodide, nitrate, sulfate, carbonate, cyanide, oxalate, thiocyanate, isocyanate, perchlorate, isothiocyanate, an alkanesulfonate such as methanesulfonate, an arylenesulfonate such as p-toluenesulfonate, trifluoromethanesulfonate (triflate), and a $C_{1-4}$ carboxylate. In exemplary embodiments, the anion Al is not any of alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion. The $M^1$ metal is one or more of $Zn^{2+}$, $Fe^{2+}$, $Co^{+2+}$, $Ni^{2+}$, $Mo^{4+}$, $Mo^{6+}$, $Al^{+3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$ and $Cr^{3+}$. $Zn^{2+}$ is the preferred $M^1$ metal. $ZnCl_2$ is a preferred $M^1$ metal compound.

The cyanometallate compound includes an $M^2(CN)_r(X^1)_t$ anion, where r, $X^1$ and t are as described before. r is preferably 6 and t is preferably zero. The $M^2$ metal is one or more of $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Pd^{2+}$, and $Pt^{2+}$. The $M^2$ metal preferably is $Fe^{3+}$ or $Co^{3+}$, with $Co^{3+}$ being especially preferred. The cyanometallate compound preferably is an alkali metal or ammonium salt, although the corresponding cyanometallitic acid can be used. Potassium hexacyanocobaltate is a particularly preferred cyanometallate compound.

The $M^3$ metal compound is a compound of a metal $M^3$ that falls within any of Groups 3 through 15, inclusive, of the 2010 IUPAC periodic table of the elements, exclusive of titanium and silicon, and one or more anions. The $M^3$ metal may be, e.g., scandium, yttrium, lanthanum, zirconium, hafnium, vanadium, niobium, tantalum, chromium, molybdenum, tungsten, manganese, rhenium, iron, ruthenium, osmium, cobalt, rhodium, iridium, nickel, palladium, platinum, copper, silver, gold, zinc, cadmium, mercury, aluminum, gallium, indium, tellurium, tin, lead, bismuth, and the lanthanide series metals including those having atomic numbers from 58 (cerium) to 71 (lutetium), inclusive.

Preferred $M^3$ metals include yttrium, zirconium, niobium, tungsten, cobalt, scandium, vanadium, molybdenum, nickel, zinc and tin. More preferred are hafnium, aluminum, gallium, manganese and indium.

The $M^3$ metal or semi-metal compound may be insoluble in the solvent or, if soluble, may react during the preparation of the catalyst complex to form an insoluble reaction product that becomes part of the catalyst complex. The $M^3$ metal or semi-metal also preferably does not reduce a cyanometallate group or prevent the $M^1$ metal compound and cyanometallate compound from reacting to form an $M^1$ metal cyanometallate.

The anion of the $M^3$ metal compound may be for example, one or more of alkoxide, aryloxy, carboxylate, acyl, pyrophosphate, phosphate, thiophosphate, dithiophosphate, phosphate ester, thiophosphate ester, amide, oxide, siloxide, hydride, carbamate, and/or hydrocarbon anion. Exemplary embodiments include the oxide, hydrocarbyl, oxide and/or the alkoxide ions. The anion is not a halide anion or a cyanide anion.

By "alkoxide" ion it is meant a species having the form $^-$O—R, where R is an alkyl group or substituted alkyl group, and which is the conjugate base, after removal of a hydroxyl hydrogen, of an alcohol compound having the form HO—R. These alcohols may have pKa values in the range of 13 to 25 or greater. The alkoxide ion in some embodiments may contain from 1 to 20 (e.g., from 1 to 6 and/or from 2 to 6) carbon atoms. The alkyl group or substituted alkyl group may be linear, branched, and/or cyclic. Examples of suitable substituents include, e.g., additional hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of such alkoxide ions include methoxide, ethoxide, isopropoxide, n-propoxide, n-butoxide, sec-butoxide, t-butoxide, and benzyloxy. The R group may contain one or more hydroxyl groups and/or may contain one or more ether linkages. An alkoxide ion may correspond to the residue (after removal of one or more hydroxyl hydrogens) of a starter compound that is present in the polymerization, such as those starter compounds described below. The alkoxide ion may be an alkoxide formed by removing one or more hydroxyl hydrogens from a polyether monol or polyether polyol; such an alkoxide in some embodiments corresponds to a residue, after removal of one or more hydroxyl hydrogen atoms, of the polyether monol or polyether polyol product that is obtained from the alkoxylation reaction, or of a polyether having a molecular weight intermediate to that of the starter compound and the product of the alkoxylation reaction.

By "aryloxy" anion it is meant a species having the form $^-$O—Ar, where Ar is an aromatic group or substituted group, and which corresponds, after removal of a hydroxyl hydrogen, to a phenolic compound having the form HO—Ar. These phenolic compounds may have a pKa of, e.g., from about 9 to about 12. Examples of such aryloxy anions include phenoxide and ring-substituted phenoxides, wherein the ring-substituents include, e.g., alkyl, $CF_3$, cyano, $COCH_3$, halogen, hydroxyl, and alkoxyl. The ring-substituent(s), if present, may be in one or more of the ortho-, para- and/or meta-positions relative to the phenolic group. The phenoxide anions also include the conjugate bases of polyphenolic compounds such as bisphenol A, bisphenol F and various other bisphenols, 1,1,1-tris(hydroxyphenyl)ethane, and fused ring aromatics such as 1-naphthol.

By "carboxylate" anion it is meant a carboxylate that contains from 1 to 24 (e.g., from 2 to 18 and/or from 2 to 12) carbon atoms. The carboxylate may be aliphatic or aromatic. An aliphatic carboxylic acid may contain substituent groups. Examples of such include hydroxyl groups (which may be in the alkoxide form), ether groups, carbonyl groups, ester groups, urethane groups, carbonate groups, silyl groups, aromatic groups such as phenyl and alkyl-substituted phenyl, and halogens. Examples of aliphatic carboxylate anions include formate, acetate, propionate, butyrate, 2-ethylhexanoate, n-octoate, decanoate, laurate and other alkanoates and halogen-substituted alkanoates such as 2,2,2-trifluoroacetate, 2-fluoroacetate, 2,2-difluoroacetate, 2-chloroacetate, and 2,2,2-trichloroacetate. Examples of aromatic carboxylates include benzoate, alkyl-substituted benzoate, halo-substituted benzoate, 4-cyanobenzoate, 4-trifluoromethylbenzoate, salicylate, 3,5-di-t-butylsalicylate, and subsalicylate. In some embodiments, such a carboxylate ion may be the conjugate base of a carboxylic acid having a pKa from 1 to 6 (e.g., from 3 to 5).

By "acyl" anion it is meant a conjugate base of a compound containing a carbonyl group including, e.g., an aldehyde, ketone, acetylacetonate, carbonate, ester or similar compound that has an enol form. Examples of these are β-diketo compounds, such as acetoacetonate and butylacetoacetonate.

By "phosphate" anion it is meant a phosphate anion that have the formula —O—P(O)(OR$_1$)$_2$, wherein R$_1$ is alkyl, substituted alkyl, phenyl, or substituted phenyl. By "thiophosphate" anion it is meant thiophosphate anions have the corresponding structure in which one or more of the oxygens are replaced with sulfur. The phosphate and thiophosphates may be ester anions, such as phosphate ester and thiophosphate ester.

By "pyrophosphate" anion it is meant the $P_2O_7^{4-}$ anion.

By "amide" anion it is meant an ion in which a nitrogen atom bears a negative charge. The amide ion generally takes the form —N(R$_2$)$_2$, wherein the R$_2$ groups are independently hydrogen, alkyl, aryl, trialkylsilyl, or triarylsilyl. The alkyl groups may be linear, branched, or cyclic. Any of these groups may contain substituents such as ether or hydroxyl. The two R$_2$ groups may together form a ring structure, which ring structure may be unsaturated and/or contain one or more heteroatoms (in addition to the amide nitrogen) in the ring.

By "oxide" anion is meant the anion of atomic oxygen, i.e., $O^{2-}$.

By "siloxide" anion it is meant silanoates having the formula (R$_3$)$_3$SiO—, wherein R$_3$ groups are independently hydrogen or alkyl group.

By "hydride" anion it is meant the anion of hydrogen, i.e., $H^-$.

By "carbamate" anion it is meant the anion —OOCNH$_2$.

By "hydrocarbon" anion it is meant hydrocarbyl anions that include aliphatic, cycloaliphatic and/or aromatic anions wherein the negative charge resides on a carbon atom. The hydrocarbyl anions are conjugate bases of hydrocarbons that typically have pKa values in excess of 30. The hydrocarbyl anions may also contain inert substituents. Of the aromatic hydrocarbyl anions, phenyl groups and substituted phenyl groups may be used. Aliphatic hydrocarbyl anions may be alkyl groups, e.g., which contain from 1 to 12 (e.g., from 2 to 8) carbon atoms. For example, methyl, ethyl, n-propyl, isopropyl, n-butyl, sec-butyl, isobutyl, cyclopentadienyl and t-butyl anions are all useful.

Examples of compounds for use in the additive compound include but are not limited to:

a) magnesium alkyls such as diethyl magnesium, dibutyl magnesium, butylethyl magnesium, dibenzyl magnesium and the like; magnesium alkoxides such as magnesium methoxide, magnesium ethoxide, magnesium isopropoxide, magnesium t-butoxide, magnesium sec-butoxide and the like; magnesium aryloxides such as magnesium phenoxide, and magnesium phenoxides in which one or more of the phenoxide groups is ring-substituted with alkyl, CF$_3$, cyano, COCH$_3$, halogen, hydroxyl, alkoxyl and the like; magnesium carboxylates such as magnesium formate, magnesium acetate, magnesium propionate, magnesium 2-ethylhexanoate, magnesium benzoate, magnesium benzoates in which one or more of the benzoate groups is ring-substituted with alkyl, CF$_3$, cyano, COCH$_3$, halogen, hydroxyl, alkoxyl and the like, magnesium salicylate, magnesium 3,5-di-t-butyl salicylate; magnesium amides such as magnesium dimethylamide, magnesium diethylamide, magnesium diphenylamide, magnesium bis(trimethylsilyl)amide and the like; magnesium oxide, magnesium acetylacetonate and magnesium t-butylacetylacetonate;

b) scandium alkoxides such as scandium methoxide, scandium ethoxide, scandium isopropoxide, scandium t-butoxide, scandium sec-butoxide and the like; scandium oxide; scandium aryloxides such as scandium phenoxide and scandium phenoxides in which one or more of the phenoxide groups is ring-substituted with alkyl, CF$_3$, cyano, COCH$_3$, halogen, hydroxyl, alkoxyl and the like; scandium carboxylates such as scandium formate, scandium acetate, scandium propionate, scandium 2-ethylhexanoate, scandium benzoate, scandium benzoates in which one or more of the benzoate groups is ring-substituted with alkyl, CF$_3$, cyano, COCH$_3$, halogen, hydroxyl, alkoxyl and the like; scandium salicylate; scandium acetylacetonate and scandium t-butylacetylacetonate;

c) yttrium alkoxides such as yttrium methoxide, yttrium ethoxide, yttrium isopropoxide, yttrium t-butoxide, yttrium sec-butoxide and the like; yttrium oxide; yttrium aryloxides such as yttrium phenoxide, and yttrium phenoxides in which one or more of the phenoxide groups is ring-substituted with alkyl, CF$_3$, cyano, COCH$_3$, halogen, hydroxyl, alkoxyl and the like; yttrium carboxylates such as yttrium formate, yttrium acetate, yttrium propionate, yttrium 2-ethylhexanoate, yttrium benzoate, yttrium benzoates in which one or more of the benzoate groups is ring-substituted with alkyl, CF$_3$, cyano, COCH$_3$, halogen, hydroxyl, alkoxyl and the like, yttrium salicylate, yttrium 3,5-di-t-butyl salicylate; yttrium amides such as yttrium dimethylamide, yttrium diethylamide, yttrium diphenylamide, yttrium bis(trimethylsilyl)amide and the like; yttrium acetylacetonate and yttrium t-butylacetylacetonate;

d) hafnium alkyls such as such as tetraethyl hafnium, tetrabutyl hafnium, tetrabenzyl hafnium and the like; hafnium oxide; hafnium alkoxides such as hafnium tetramethoxide, hafnium tetraethoxide, hafnium tetraisopropoxide, hafnium tetra-t-butoxide, hafnium tetra-sec-butoxide and the like; hafnium aryloxides such as hafnium phenoxide and hafnium phenoxides in which one or more of the phenoxide groups is ring-substituted with alkyl, CF$_3$, cyano, COCH$_3$, halogen, hydroxyl, alkoxyl and the like; hafnium carboxylates such as hafnium formate, hafnium acetate, hafnium propionate, hafnium 2-ethylhexanoate, hafnium benzoate, hafnium benzoates in which one or more of the benzoate groups is ring-substituted with alkyl, CF$_3$, cyano, COCH$_3$, halogen, hydroxyl, alkoxyl and the like, hafnium salicylate, hafnium 3,5-di-t-butyl salicylate; hafnium amides such as hafnium tetra(dimethylamide), hafnium tetra(diethylamide), hafnium tetra(diphenylamide), hafnium tetra((bistrimethylsilyl)amide); hafnium acetylacetonate and hafnium t-butylacetylacetonate;

e) zirconium alkyls such as such as tetraethyl zirconium, tetrabutyl zirconium, tetrabenzyl zirconium and the like; zirconium oxide; zirconium alkoxides such as zirconium tetramethoxide, zirconium tetraethoxide, zirconium tetraisopropoxide, zirconium tetra-t-butoxide, zirconium tetra-sec-butoxide and the like; zirconium aryloxides such as zirconium phenoxide and zirconium phenoxides in which one or more of the phenoxide groups is ring-substituted with alkyl, $CF_3$, cyano, $COCH_3$, halogen, hydroxyl, alkoxyl and the like; zirconium carboxylates such as zirconium formate, zirconium acetate, zirconium propionate, zirconium 2-ethylhexanoate, zirconium benzoate, zirconium benzoates in which one or more of the benzoate groups is ring-substituted with alkyl, $CF_3$, cyano, $COCH_3$, halogen, hydroxyl, alkoxyl and the like, zirconium salicylate, zirconium 3,5-di-t-butyl salicylate; zirconium amides such as zirconium tetra(dimethylamide), zirconium tetra(diethylamide, zirconium tetra (diphenylamide), zirconium tetra((bistrimethylsilyl)amide); zirconium acetylacetonate and zirconium t-butylacetylacetonate;

f) vanadium alkoxides such as vanadium methoxide, vanadium ethoxide, vanadium isopropoxide, vanadium t-butoxide, vanadium sec-butoxide and the like; vanadium oxide; vanadium oxo tris(alkoxides) such as vanadium oxo tris(methoxide), vanadium oxo tris(ethoxide), vanadium oxo tris(isopropoxide), vanadium oxo tris(t-butoxide), vanadium oxo tris(sec-butoxide) and the like; vanadium aryloxides such as vanadium phenoxide and vanadium phenoxides in which one or more of the phenoxide groups is ring-substituted with alkyl, $CF_3$, cyano, $COCH_3$, halogen, hydroxyl, alkoxyl and the like; vanadium carboxylates such as vanadium formate, vanadium acetate, vanadium propionate, vanadium 2-ethylhexanoate, vanadium benzoate, vanadium benzoates in which one or more of the benzoate groups is ring-substituted with alkyl, $CF_3$, cyano, $COCH_3$, halogen, hydroxyl, alkoxyl and the like, vanadium salicylate, vanadium 3,5-di-t-butyl salicylate; vanadium tris(acetylacetonate) and vanadium tris(t-butylacetylacetonate); vanadium oxo bis(acetylacetonate);

g) zinc alkyls such as such as dimethyl zinc, diethyl zinc, dibutyl zinc, dibenzyl zinc and the like; zinc oxide; alkyl zinc alkoxides such as ethyl zinc isopropoxide; zinc alkoxides such as zinc methoxide, zinc ethoxide, zinc isopropoxide, zinc t-butoxide, zinc sec-butoxide and the like; zinc aryloxides such as zinc phenoxide and zinc phenoxides in which one or more of the phenoxide groups is ring-substituted with alkyl, $CF_3$, cyano, $COCH_3$, halogen, hydroxyl, alkoxyl and the like; zinc carboxylates such as zinc formate, zinc acetate, zinc propionate, zinc 2-ethylhexanoate, zinc benzoate, zinc benzoates in which one or more of the benzoate groups is ring-substituted with alkyl, $CF_3$, cyano, $COCH_3$, halogen, hydroxyl, alkoxyl and the like, zinc salicylate, zinc 3,5-di-t-butyl salicylate; zinc amides such as zinc dimethylamide, zinc diethylamide, zinc diphenylamide, zinc (bistrimethylsilyl)amide; zinc acetylacetonate and zinc t-butylacetylacetonate;

h) trialkyl aluminum compounds such as trimethylaluminum, triethyl aluminum, tributyl aluminum, tribenzylaluminum and the like; aluminum alkoxides such as aluminum trimethoxide, aluminum triethoxide, aluminum triisopropoxide, aluminum tri-t-butoxide, aluminum tri-sec-butoxide and the like; aluminum aryloxides such as aluminum phenoxide and aluminum phenoxides in which one or more of the phenoxide groups is ring-substituted with alkyl, $CF_3$, cyano, $COCH_3$, halogen, hydroxyl, alkoxyl and the like; aluminum oxide; aluminum carboxylates such as aluminum formate, aluminum acetate, aluminum propionate, aluminum 2-ethylhexanoate, aluminum benzoate, aluminum benzoates in which one or more of the benzoate groups is ring-substituted with alkyl, $CF_3$, cyano, $COCH_3$, halogen, hydroxyl, alkoxyl and the like, aluminum salicylate, aluminum 3,5-di-t-butyl salicylate; aluminum amides such as aluminum tris(dimethylamide), aluminum tris(diethylamide), aluminum tris(diphenylamide), aluminum tris(di(trimethylsilyl)amide) and the like; aluminum acetylacetonate; aluminum t-butylacetylacetonate; and alkylaluminum oxides and alkoxides such as diethylaluminum ethoxide, dimethylaluminum ethoxide, diethylaluminum isopropoxide, dimethylaluminum isopropoxide, methyl aluminoxane, tetraethyldialuminoxane and the like;

i) trialkyl gallium compounds such as trimethylgallium, triethyl gallium, tributyl gallium, tribenzylgallium and the like; gallium oxide; gallium alkoxides such as gallium trimethoxide, gallium triethoxide, gallium triisopropoxide, gallium tri-t-butoxide, gallium tri-sec-butoxide and the like; gallium aryloxides such as gallium phenoxide and gallium phenoxides in which one or more of the phenoxide groups is ring-substituted with alkyl, $CF_3$, cyano, $COCH_3$, halogen, hydroxyl, alkoxyl and the like; gallium carboxylates such as gallium formate, gallium acetate, gallium propionate, gallium 2-ethylhexanoate, gallium benzoate, gallium benzoates in which one or more of the benzoate groups is ring-substituted with alkyl, $CF_3$, cyano, $COCH_3$, halogen, hydroxyl, alkoxyl and the like, gallium salicylate, gallium 3,5-di-t-butyl salicylate; gallium amides such as gallium tris(dimethylamide), gallium tris(diethylamide), gallium tris (diphenylamide), gallium tris(di(trimethylsilyl)amide) and the like; gallium acetylacetonate; gallium t-butylacetylacetonate; and alkylgallium alkoxides such as diethylgallium ethoxide, dimethylgallium ethoxide, diethylgallium isopropoxide and dimethylgallium isopropoxide;

j) trialkyl indium compounds like trimethyl indium; indium oxide; indium alkoxides such as indium methoxide, indium ethoxide, indium isopropoxide, indium t-butoxide, indium sec-butoxide and the like; indium aryloxides such as indium phenoxide and indium phenoxides in which one or more of the phenoxide groups is ring-substituted with alkyl, $CF_3$, cyano, $COCH_3$, halogen, hydroxyl, alkoxyl and the like; indium carboxylates such as indium formate, indium acetate, indium propionate, indium 2-ethylhexanoate, indium benzoate, indium benzoates in which one or more of the benzoate groups is ring-substituted with alkyl, $CF_3$, cyano, $COCH_3$, halogen, hydroxyl, alkoxyl and the like, indium salicylate, indium 3,5-di-t-butyl salicylate; indium acetylacetonate; and indium t-butylacetylacetonate;

k) stannous phosphate; stannous pyrophosphate, stannous oxide; stannic oxide; stannous alkoxides such as stannous methoxide, stannous ethoxide, stannous isopropoxide, stannous t-butoxide, stannous sec-butoxide and the like; stannous aryloxides such as stannous phenoxide and stannous phenoxides in which one or more of the phenoxide groups is ring-substituted with alkyl, $CF_3$, cyano, $COCH_3$, halogen, hydroxyl, alkoxyl and the like; stannous carboxylates such as stannous formate, stannous acetate, stannous propionate, stannous 2-ethylhexanoate, stannous benzoate, stannous benzoates in which one or more of the benzoate groups is ring-substituted with alkyl, $CF_3$, cyano, $COCH_3$, hydroxyl, alkoxyl and the like, stannous salicylate, stannous 3,5-di-t-butyl salicylate; stannous acetylacetonate; and stannous t-butylacetylacetonate;

k) manganese phosphate; pyrophosphate, manganese oxide; manganese alkoxides such as manganese methoxide, manganese ethoxide, manganese isopropoxide, manganese t-butoxide, manganese sec-butoxide and the like; manganese aryloxides such as manganese phenoxide and manganese phenoxides in which one or more of the phenoxide groups is ring-substituted with alkyl, $CF_3$, cyano, $COCH_3$, halogen, hydroxyl, alkoxyl and the like; manganese carboxylates such as manganese formate, manganese acetate, manganese propionate, manganese 2-ethylhexanoate, manganese benzoate, manganese benzoates in which one or more of the benzoate groups is ring-substituted with alkyl, CF₃, cyano, COCH₃, halogen, hydroxyl, alkoxyl and the like, manganese salicylate, manganese 3,5-di-t-butyl salicylate; manganese acetylacetonate; and manganese t-butylacetylacetonate.

m) molybdenum compounds, including Mo(IV) and/or Mo(VI) compounds such as molybdenum phosphate; molybdenum pyrophosphate, molybdenum oxide; molybdenum alkoxides such as molybdenum methoxide, molybdenum ethoxide, molybdenum isopropoxide, molybdenum t-butoxide, molybdenum sec-butoxide and the like; molybdenum aryloxides such as molybdenum phenoxide and molybdenum phenoxides in which one or more of the phenoxide groups is ring-substituted with alkyl, CF₃, cyano, COCH₃, halogen, hydroxyl, alkoxyl and the like; molybdenum carboxylates such as molybdenum formate, molybdenum acetate, molybdenum propionate, molybdenum 2-ethylhexanoate, molybdenum benzoate, molybdenum benzoates in which one or more of the benzoate groups is ring-substituted with alkyl, CF₃, cyano, COCH₃, halogen, hydroxyl, alkoxyl and the like, molybdenum salicylate, molybdenum 3,5-di-t-butyl salicylate; molybdenum acetylacetonate; and molybdenum t-butylacetylacetonate; in each case being an Mo(IV) or (MoVI) compound;

n) cobalt (II) and/or Co(III) compounds such as cobalt phosphate; cobalt pyrophosphate, cobalt oxide; cobalt alkoxides such as cobalt methoxide, cobalt ethoxide, cobalt isopropoxide, cobalt t-butoxide, cobalt sec-butoxide and the like; cobalt aryloxides such as cobalt phenoxide and cobalt phenoxides in which one or more of the phenoxide groups is ring-substituted with alkyl, CF₃, cyano, COCH₃, halogen, hydroxyl, alkoxyl and the like; cobalt carboxylates such as cobalt formate, cobalt acetate, cobalt propionate, cobalt 2-ethylhexanoate, cobalt benzoate, cobalt benzoates in which one or more of the benzoate groups is ring-substituted with alkyl, CF₃, cyano, COCH₃, halogen, hydroxyl, alkoxyl and the like, cobalt salicylate, cobalt 3,5-di-t-butyl salicylate; cobalt acetylacetonate; and cobalt t-butylacetylacetonate, in each case being a Co(II) and/or Co(III) compound;

o) tungsten compounds such as tungsten phosphate; tungsten pyrophosphate, tungsten oxide; tungsten alkoxides such as tungsten methoxide, tungsten ethoxide, tungsten isopropoxide, tungsten t-butoxide, tungsten sec-butoxide and the like; tungsten aryloxides such as tungsten phenoxide and tungsten phenoxides in which one or more of the phenoxide groups is ring-substituted with alkyl, CF₃, cyano, COCH₃, halogen, hydroxyl, alkoxyl and the like; tungsten carboxylates such as tungsten formate, tungsten acetate, tungsten propionate, tungsten 2-ethylhexanoate, tungsten benzoate, tungsten benzoates in which one or more of the benzoate groups is ring-substituted with alkyl, CF₃, cyano, COCH₃, halogen, hydroxyl, alkoxyl and the like, tungsten salicylate, tungsten 3,5-di-t-butyl salicylate; tungsten acetylacetonate; and tungsten t-butylacetylacetonate; and p) iron (II) and/or iron (III) compounds such as iron phosphate; iron pyrophosphate, iron oxide; iron alkoxides such as iron methoxide, iron ethoxide, iron isopropoxide, iron t-butoxide, iron sec-butoxide and the like; iron aryloxides such as iron phenoxide and iron phenoxides in which one or more of the phenoxide groups is ring-substituted with alkyl, CF₃, cyano, COCH₃, halogen, hydroxyl, alkoxyl and the like; iron carboxylates such as iron formate, iron acetate, iron propionate, iron 2-ethylhexanoate, iron benzoate, iron benzoates in which one or more of the benzoate groups is ring-substituted with alkyl, CF₃, cyano, COCH₃, halogen, hydroxyl, alkoxyl and the like, iron salicylate, iron 3,5-di-t-butyl salicylate; iron acetylacetonate; and iron t-butylacetylacetonate, in each case being a Fe(II) and/or Fe(III) compound.

The catalyst complex of the invention (including those prepared in the process described above) in some embodiments corresponds to the formula:

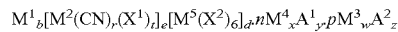

wherein the variables are as described before. $M^1$ and $M^4$ each most preferably are zinc. $M^2$ and $M^5$ each most preferably are iron or cobalt, especially cobalt. $M^3$ and $A^2$ preferably are as described above with regard to the $M^3$ metal compound. r is most preferably 6 and t is most preferably zero. d is most preferably 0-1. The mole ratio of $M^1$ and $M^4$ metals combined to $M^2$ and $M^5$ metals combined is preferably 0.8:1 to 20:1. The mole ratio of $M^3$ metal to $M^2$ and $M^5$ metals combined may be, for example, 0.002 to 10 as determined by X-ray fluorescence (XRF) methods. It is noted that the ratios of metals in the catalyst complex may differ substantially from the ratios employed in the catalyst preparation process.

The formula in the foregoing process is not intended to denote any special crystalline form or other spatial or chemical relationship between the $M^1_b[M^2(CN)_r(X^1)_t]_e[M^5(X^2)_6]_d$, $M^4_xA^1_y$, and $M^3_wA^2_z$ components of the catalyst complex. Scanning transmission electron microscopy analysis of certain catalyst complexes of the invention has revealed that in such embodiments at least some of the catalyst complex comprises hybrid particles having both an $M^1_b[M^2(CN)_r(X^1)_t]_e$ phase and an $M^3$ metal oxide (i.e., $M^3_wO_z$ phase). The $M^4_xA^1_y$ phase, when present, is believed to reside at least partially on particles of the $M^1_b[M^2(CN)_r(X^1)_t]_e$ phase. In addition to such hybrid particles, the catalyst complex may contain particles of the $M^1_b[M^2(CN)_r(X^1)_t]_e$ phase or of a $M^1_b[M^2(CN)_r(X^1)_t]_e[M^5(X^2)_6]_d \cdot nM^4_xA^1_y$ phase only, and other particles of the $M^4_xA^1_y$ phase only. Some of the $M^3$ metal may become incorporated into the $M^1_b[M^2(CN)_r(X^1)_t]_e$ phase or into a $M^1_b[M^2(CN)_r(X^1)_t]_e[M^5(X^2)_6]_d \cdot nM^4_xA^1_y$ phase.

In certain embodiments, the catalyst complex of the invention comprises a physical admixture of particles of a water-insoluble zinc hexacyanocobaltate with particles of an $M^3$ metal oxide, the $M^3$ metal oxide particles being present in an amount to provide 0.002 to 10 moles of $M^3$ metal per mole of cobalt provided by the zinc hexacyanocobaltate, and further wherein the $M^3$ metal oxide particles have a surface area of at least 1 m²/g as measured using gas sorption methods. The surface area of the $M^3$ metal oxide particles may be at least 10 m²/g or at least 100 m²/g, and may be up to, for example, 300 m³/g or more. Their volume average particle size may be 100 μm or smaller, 25 μm or smaller, 1 μm or smaller or 500 nm or smaller. Such physical admixtures can be made by, for example, forming solid particles of the zinc hexacyanocobaltate and combining them with the $M^3$ metal oxide particles. This can be done at any stage of the zinc hexacyanocobaltate preparation process after the zinc hexacyanocobaltate has precipitated. For example, it is common to wash a precipitated zinc hexacyanocobaltate with water and/or a ligand one or more times before final drying. The $M^3$ metal oxide can be combined with the zinc hexacyanocobaltate during any such washing step.

Catalyst complexes of any of the foregoing aspects of the invention are useful for polymerizing alkylene oxides to make polyethers and for copolymerizing alkylene oxides with carbon dioxide to produce polycarbonates. Polyester polyols also can be produced using a catalyst complex of the invention as a polymerization catalyst. Polyethers made using the catalyst complexes may include monoalcohols such as are useful for surfactant and industrial solvent or lubricant applications, and polyols such as are useful raw materials for producing polymers such as polyurethanes. Examples include polyether monols and polyols, which are inclusive of polyether hybrid monols and polyols such as polyether carbonate monols and polyols, and polyether ester monols and polyols.

Polyethers are conveniently prepared according to the invention in a process that comprises: (1) combining the catalyst complex with an alcoholic or carboxyl-containing starter compound; (2) adding an alkylene oxide to form a polymerization mixture, and then (3) subjecting the polymerization mixture to polymerization conditions. Carbon dioxide is present during the polymerization step when a polycarbonate is made.

The main functions of the starter compound are to provide molecular weight control and to establish the number of hydroxyl groups that the polyether product will have. A hydroxyl-containing starter compound may contain 1 or more (e.g., 2 or more) hydroxyl groups and as many as 12 or more hydroxyl groups. For example, starters for producing polyols for use in polyurethane applications usually will have from 2 to 8 hydroxyl groups per molecule. In some embodiments, the starter compound will have from 2 to 4 or from 2 to 3 hydroxyl groups. In other embodiments, the starter compound will have from 4 to 8 or from 4 to 6 hydroxyl groups. The starter compound may have at least two hydroxyl groups that are in the 1,2- or 1,3-positions with respect to each other (taking the carbon atom to which one of the hydroxyl groups is bonded as the "1" position). Mixtures of starter compounds can be used.

The starter compound will have a hydroxyl equivalent weight less than that of the monol or polyol product. It may have a hydroxyl equivalent weight of from 30 to 500 or more. The equivalent weight may be up to 500, up to 250, up to 125, and/or up to 100.

Exemplary starters include, but are not limited to, glycerin, ethylene glycol, diethylene glycol, triethylene glycol, propylene glycol, dipropylene glycol, tripropylene glycol, 1,4-butane diol, 1,6-hexane diol, 1,8-octane diol, cyclohexane dimethanol, glycerin, trimethylolpropane, trimethylolethane, pentaerythritol, sorbitol, sucrose, phenol and polyphenolic starters such as bisphenol A or 1,1,1-tris(hydroxyphenyl)ethane, alkoxylates (such as ethoxylates and/or propoxylates) of any of these that have a hydroxyl equivalent weight less than that of the product of the polymerization. The starter compound can also be water. The starter may be neutralized with or contain a small amount of an acid, particularly if the starter is prepared in the presence of a base (as is often the case with glycerin). If an acid is present, it may be present in an amount of from about 10 to 100 ppm, based on the weight of the starter, e.g., as described in U.S. Pat. No. 6,077,978. The acid may be used in somewhat larger amounts, such as from 100 to 1000 ppm, based on the weight of the starter, as described in U.S. Patent Publication Application No. 2005-0209438. The acid may be added to the starter before or after the starter is combined with the catalyst complex.

Certain starters may provide specific advantages. Triethylene glycol has been found to be an especially good starter for use in batch and semi-batch processes for producing polyether diols. Tripropylene glycol and dipropylene glycol also have been found to be especially good starters for use in conjunction with the catalyst complex of the invention.

The alkylene oxide may be, e.g., ethylene oxide, 1,2-propylene oxide, 2,3-propylene oxide, 1,2-butane oxide, 2-methyl-1,2-butaneoxide, 2,3-butane oxide, tetrahydrofuran, epichlorohydrin, hexane oxide, styrene oxide, divinylbenzene dioxide, a glycidyl ether such as Bisphenol A diglycidyl ether, allyl glycidyl ether, or other polymerizable oxirane. The preferred alkylene oxide for making polyethers is 1,2-propylene oxide, or a mixture of at least 40% (preferably at least 80%) by weight propylene oxide and up to 60% by weight (preferably up to 20%) ethylene oxide.

When making polycarbonates in accordance with the invention, a preferred alkylene oxide is propylene oxide or a mixture of propylene oxide and ethylene oxide. The polycarbonate may contain, for example, 1 to 20%, especially 1 to 15% or 2 to 10% by weight of $CO_2$ in the form of carbonate linkages.

The polymerization conditions used to make a polyether or polycarbonate in accordance with the invention typically include an elevated temperature. The polymerization temperature may be, for example, 80 to 220° C. (e.g., from 120 to 190° C.). The polymerization reaction usually may be performed at superatmospheric pressures, but can be performed at atmospheric pressure or even sub-atmospheric pressures.

Enough of the catalyst complex may be used to provide a reasonable polymerization rate, but it is generally desirable to use as little of the catalyst complex as possible consistent with reasonable polymerization rates, as this both reduces the cost for the catalyst and, if the catalyst levels are low enough, can eliminate the need to remove catalyst residues from the product. The amount of catalyst complex may be from 1 to 5000 ppm based on the weight of the product. The amount of catalyst complex may be at least 2 ppm, at least 5 ppm, at least 10 ppm, at least 25 ppm, or up to 500 ppm or up to 200 ppm or up to 100 ppm, based on the weight of the product. The amount of catalyst complex may be selected to provide 0.25 to 20, 0.5 to 10, 0.5 to 1 or 0.5 to 2.5 parts by weight cobalt per million parts by weight of the product.

The polymerization reaction may be performed in any type of vessel that is suitable for the pressures and temperatures encountered. In a continuous or semi-batch process, the vessel should have one or more inlets through which the alkylene oxide and additional starter compound and catalyst complex can be introduced during the reaction. In a continuous process, the reactor vessel should contain at least one outlet through which a portion of the partially polymerized reaction mixture can be withdrawn. In a semi-batch operation, alkylene oxide (and optionally additional starter and catalyst complex) is added during the reaction, but product usually is not removed until the polymerization is completed. A tubular reactor that has multiple points for injecting the starting materials, a loop reactor, and a continuous stirred tank reactor (CTSR) are all suitable types of vessels for continuous or semi-batch operations. The reactor should be equipped with a means of providing or removing heat, so the temperature of the reaction mixture can be maintained within the required range. Suitable means include various types of jacketing for thermal fluids, various types of internal or external heaters, and the like. A cook-down step performed on continuously withdrawn product is conveniently conducted in a reactor that prevents significant back-mixing from occurring. Plug flow operation in a pipe or tubular reactor is a preferred manner of performing such a cook-down step.

The product obtained in any of the foregoing processes may contain up to 0.5% by weight, based on the total weight, of unreacted alkylene oxide; small quantities of the starter compound and low molecular weight alkoxylates thereof;

and small quantities of other organic impurities and water. Volatile impurities should be flashed or stripped from the resultant monol or polyol. The product typically contains catalyst residues. It is typical to leave these residues in the product, but these can be removed if desired. Moisture and volatiles can be removed by stripping the polyol.

The catalyst complex and residues thereof may be left in the resultant product if desired. They do not need to be filtered out from the final product.

Polyethers produced using the catalyst complex of the invention may be useful for making polyurethanes based productions, among other things. Exemplary polyurethane based productions include foams (such as molded foams, slabstock foams, high resiliency foams, viscoelastic foams, rigid foams, etc.), adhesives, sealants, coatings, elastomers, composites, etc.

The following examples are provided to illustrate exemplary embodiments and are not intended to limit the scope thereof. All parts and percentages are by weight unless otherwise indicated.

EXAMPLES 1-4 AND COMPARATIVE SAMPLES A-C

To make Example 1: A mixture of zinc chloride (16.00 grams, 117.4 mmol), tert-butyl alcohol (20 mL), and deionized water (20 mL) is heated to 40° C. in a round-bottomed flask. Subsequently, aluminum sec-butoxide (in an amount as indicated in Table 1) and aqueous HCl (48 µL, 0.001 M) are added to the flask and the mixture is stirred for 10 minutes are ambient conditions. Next, a solution of potassium hexacyanocobaltate (3.44 grams, 10.4 mmol) premixed with water (40 mL) is added dropwise over a period of 2.5 hours. The mixture in the flask then is heated under reflux until a white gel forms after a period of approximately 20 hours. The resultant gel is dispersed in water (60 mL) and tert-butyl alcohol (60 mL) and centrifuged (5000 rpm) for a period of 15 minutes. The solvent is decanted and the resultant material is again dispersed in a mixture of water (60 mL) and tert-butyl alcohol (60 mL). The resultant dispersion is heated to 55° C. for 35 minutes and then centrifuged (5000 rpm) for a period of 15 minutes. The resultant material is then washed four times with 50/50 by volume mixture of distilled water and tert-butyl alcohol and once more using tert-butyl alcohol (120 mL). The washed material is dried under vacuum at 70° C. overnight to a constant pressure (<10 mbar). The resultant dried solid is milled, forming a catalyst sample in the form of a finely divided powder.

Examples 2-4 and Comparative Samples A and B are made in the same way except the amount of aluminum sec-butoxide added into the preparation is varied. The aluminum sec-butoxide is eliminated altogether in making Comparative Sample C. The mole ratios of cobalt:zinc:aluminum added into the catalyst preparation for these various samples are as indicated in Table 1. The mole ratios of cobalt:zinc:aluminum in the process are determined by XRF, with results as indicated in Table 1.

TABLE 1

| Designation | Aluminum sec-butoxide, g (mmol) | Co:Zn:Al mole ratio, prep | Co:Zn:Al mole ratio, product |
|---|---|---|---|
| A* | 0.0084 g, 0.034 mmol | 1:11.3:0.003 | 1:2:<0.001 |
| 1 | 0.084 g, 0.340 mmol | 1:11.3:0.032 | 1:2:0.003 |
| 2 | 0.83 g, 3.4 mmol | 1:11.3:0.32 | 1:2.0:0.2 |
| 3 | 8.27 g, 33.6 mmol | 1:11.3:3.2 | 1:2.2:2.8 |
| 4 | 16.55 g, 67.2 mmol | 1:11.3:6.4 | 1:2.8:5.2 |
| B* | 82.74 g, 336 mmol | 1:11.3:32 | 1:8.5:32 |
| C* | None | 1:11.3:0 | 1:2:0 |

Catalyst Examples 1-4 and Comparative Samples A, B and C are used to produce polyether polyols in a semi-batch process. Dipropylene glycol (475.4 g) and 142.0 milligrams of the catalyst sample (enough to provide 100 parts per million based on the expected mass of the product) are added a 7 L Juchheim reactor at 60° C. and stirred at 50 rpm under dry nitrogen. The reactor is closed and set to 100° C. and 400 rpm. Then, the atmosphere within the reactor is purged with dry nitrogen and vacuum is applied. This part of the procedure is repeated four additional times. The reactor is isolated and placed under vacuum for one hour at 160° C. to dry the starting materials. 140 g of propylene oxide are then added to the reactor at the same temperature. This raises the internal reactor pressure to about 3 bar gauge (304 kPa) (all pressures reported herein are gauge pressures unless noted otherwise). The pressure inside the reactor is continuously monitored for a pressure drop that indicates catalyst activation has taken place. The time required for the reactor pressure to drop to 1 bar (101 kPa) is noted as the activation time. 40 minutes after the start of the process (or upon catalyst activation in cases in which the catalyst has not yet activated after 40 minutes), 868.8 g of propylene oxide is fed to the reaction at 160° C. The feed rate is increased linearly from zero to 29 g/min over the course of one hour unless the internal pressure during the feed reaches 4 bar (405 kPa), in which case the feed rate is discontinued until the pressure drops to 3.5 bar (354 kPa), at which point the feed is resumed. Therefore, the shortest possible time for the propylene oxide addition is 60 minutes, which can be obtained only if the reactor pressure does not reach the pressure limit during the propylene oxide feed. After the propylene oxide is completed, the reaction mixture is digested for 15 minutes at 160° C. Vacuum is then is applied to remove any unreacted propylene oxide. The reactor is then cooled to 100° C. and 200 ppm of an antioxidant is added to the reaction mixture under dry nitrogen. Then, the product is cooled to ambient temperature and collected. Batch size is approximately 1421.8 grams in each case. The product molecular weight is 400 g/mol. During the polymerization, the hydroxyl content of the reaction mixture decreases from about 20% by weight to about 4.25% by weight.

The internal reactor pressure is monitored during the reaction as in indication of the activity of the catalyst. These polymerization conditions represent a difficult challenge for conventional double metal cyanide catalysts because of the low molecular weight of the starter (dipropylene glycol). Conventional DMC catalysts perform poorly in the presence of high concentrations of hydroxyl groups, which is the case during early stages of a semi-batch process such as this in which the starter molecular weight is low. It is for this reason that the propylene oxide feed rate is ramped up gradually after catalyst activation. The catalyst activity and therefore polymerization rate is expected to increase as the product builds molecular weight, which allows the propylene oxide to be consumed more rapidly and therefore be fed more rapidly.

FIG. 1 is a plot (line 1) of reactor pressure vs. time for Comparative Sample C and of propylene oxide feed rate vs.

time (line 21). Section 2 of line 1 represents the increase in reactor pressure during the initial propylene oxide feed. The pressure increases to about 3 bar (303 kPa). The following slow decrease in reactor pressure indicated in section 3 of line 1 indicates the consumption of propylene oxide as the catalyst activates. The time at which the pressure decreases to 1 bar (101 kPa) is indicated by point A, which is at about 55 minutes after the start of the process. Point A is taken as the catalyst activation time. Segment 4 of line 1 indicates the increase in pressure as the subsequent propylene oxide feed is commenced. As shown in FIG. 1, the reactor pressure reaches the 4 bar (405 kPa) pressure limit in 30-40 minutes. During that time, the propylene oxide feed rate reaches as high as 10 g/minute but must be discontinued or slowed periodically when the reactor pressure limit is reached.

Segment 5 of line 1 indicates that the activity of the catalyst remains very low for a period extending to approximately 200 minutes from the start of the process. During almost all of this time it is only possible to feed propylene oxide at a low feed rate of 2-7 g/minute during the corresponding time period (as shown by line 21); higher feed rates would cause the internal pressure limit to be exceeded. It is only after 180-190 minutes that the catalyst activity increases substantially, which allows the propylene oxide feed rate to be increased to 25-30 g/minute. At this point, reactor pressure falls substantially despite the rapid feed rate, as indicated by segment 6 of line 1. At this point of the reaction, propylene oxide is being consumed at rates greater than 30 g/minute. The entire amount of propylene oxide fed (868.6 grams) is consumed 210-220 minutes after the start of the process. Segment 7 of line 1 indicates the reactor pressure during the final digestion step after all propylene oxide has been fed to the reactor.

FIG. 1 demonstrates the severity of these polymerization conditions. The starter has a low equivalent weight and is present in high concentrations at the start of the reaction until a significant amount of molecular weight has been attained. These conditions make it difficult for the catalyst to even activate, and when the catalyst is activated, these conditions cause it to perform sluggishly during most of the course of the polymerization. This is despite using a rather large concentration of catalyst.

Comparative Sample A exhibits a similar pressure curve as does Comparative Sample C. Catalyst activation requires 65-70 minutes. The propylene oxide feed rate is restricted to no more than 5 g/minute until about 180 minutes after the start of the process, at which point rapid polymerization in excess of 30 g of propylene oxide per minute commences. The addition of the very small amount of aluminum into the catalyst has virtually no effect on catalyst performance.

Figure 2:
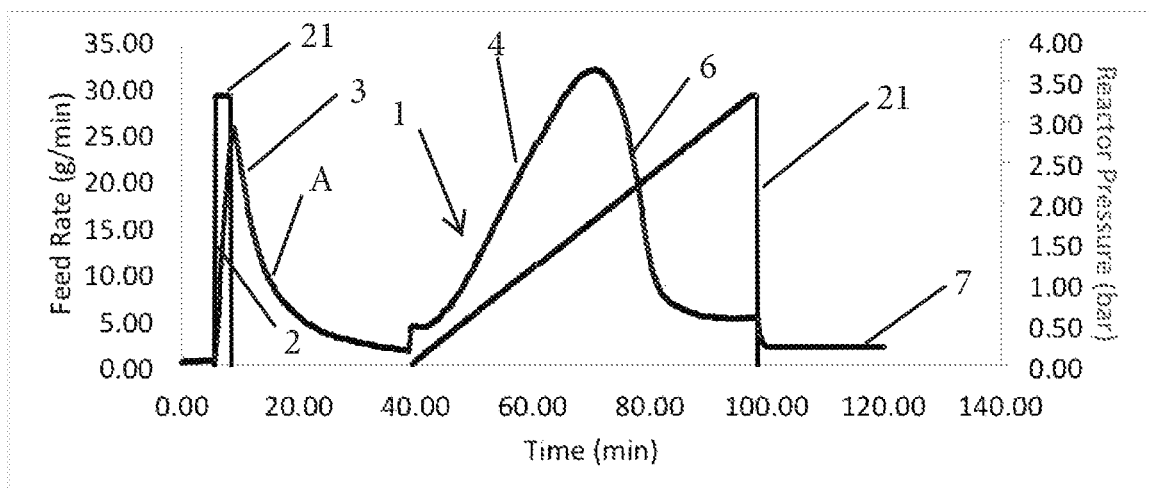
FIG. 2 illustrates a graphical representation of reactor pressure and propylene oxide feed rate vs. time for propylene oxide polymerization using a catalyst complex of the invention (Example 1).

FIG. 2 shows the corresponding pressure vs. time (line 1) and propylene oxide vs. time (line 21) plots for Example 1. The reference numerals refer to the same features as do the corresponding numerals in FIG. 1. Catalyst activation is very rapid in this example, as indicated by segment 3 of line 1. Reactor pressure falls to 1 bar (101 kPa) only 10-15 minutes after starting the process, and continues to fall to below 0.5 bar (50 kPa) before the propylene oxide feed begins. Segment 4 of line 1 shows the pressure rise as the propylene oxide feed is started. The pressure rises to 3.5-3.7 bar (355-376 kPa) as the propylene oxide feed rate increases to 15-20 g/minute. Note that the internal pressure limit is never reached despite the much faster ramping of the propylene oxide feed rate than occurred in Comparative Sample C. The peak pressure is attained after only about 70 minutes. Thereafter, the reactor pressure decreases rapidly (segment 6 of line 1) despite the further increase in propylene oxide feed rate, due to the rapid polymerization of the propylene oxide. All of the propylene oxide is fed within 100 minutes of the start of the process. Note that there is no segment of line 1 that corresponds to segment 5 in FIG. 1. With Catalyst Example 1, there is no need to restrict the propylene oxide feed rate to avoid reaching the internal reactor limit. These excellent results are attained despite the very severe conditions of this test. In fact, even faster polymerizations can be obtained using this catalyst under these conditions, by increasing the rate of the propylene oxide feed. These data also suggest that lower catalyst concentrations can be used even under these severe conditions.

The activation time, time to rapid polymerization and time to complete the propylene feed for each of Examples 1-4 and Comparative Samples A-C are as indicated in Table 2:

TABLE 2

| Designation | Co:Zn:Al mole ratio, product | Activation Time, min | Onset of Rapid Polymerization, min | Time to Complete PO feed, min |
|---|---|---|---|---|
| A* | 1:2:<0.001 | 65-70 | 180 | 210-220 |
| 1 | 1:2:0.003 | 10-15 | 70 | 100** |
| 2 | 1:2.0:0.2 | 5-10 | 65-70 | 100** |
| 3 | 1:2.2:2.8 | 5-10 | 70 | 100** |
| 4 | 1:2.8:5.2 | 40 | 90 | 105 |
| B* | 1:8.5:32 | 125 | >300 | >500[1] |
| C* | 1:2:0 | 55 | 180-190 | 210-220 |

*Not an example of the invention.
**Minimum feed time possible in this experiment; because the reactor pressure never reaches the pressure limit, faster propylene oxide feed rates could be used to obtain significantly shorter times to complete the PO feed.
[1]Rapid onset of polymerization is never clearly seen.

As can be seen from the data in Table 2, the performance of conventional DMC catalyst (Comp. C) is characterized by a long activation time and long times until the onset of rapid polymerization and until all the propylene oxide can be fed. Comparative Sample A shows that the addition of very small amounts of the aluminum compound into the catalyst preparation does not materially affect catalyst performance.

However, Examples 1-4 demonstrate very significant increases in both the rate of catalyst activation and the polymerization rate when the amount of aluminum added into the catalyst is within a range of about 0.003 to about 5.2 moles per mole of cobalt (and especially within a range of 0.003 to about 3 moles Al/mole Co). Activation times decrease and polymerization rates increase dramatically.

Comparative Sample B demonstrates that increasing the amount of aluminum too much leads to a loss of catalytic activity, as though the presence of those large amounts of aluminum is acting as a catalyst poison.

EXAMPLES 5-9

Examples 5-9 are made in the same manner as Example 1, except the aluminum sec-butoxide in each case is replaced with 33.6 mmol of an $M^3$ metal compound as set forth in Table 3. The mole ratio of Co:Zn:$M^3$ metal in the prep and as measured in the catalyst product are indicated in Table 3. In each case, the catalyst is evaluated in a polyol production process as described with regard to the preceding examples. The activation time, time to onset of rapid polymerization and the time to complete the propylene oxide addition are as indicated in Table 3.

TABLE 3

| Design. | M³ Compound | Co:Zn:M³ mole ratio, prep | Co:Zn:M³ mole ratio, product | Activation Time, min | Onset of Rapid Polymerization min | Time to Complete PO feed, min |
|---|---|---|---|---|---|---|
| Ex. 5 | Hf (IV) isopropoxide | 1:11.3:3 | 1:1.9:6.0 | <10 | 70-75 | 100** |
| Ex. 6 | Ga (III) isopropoxide | 1:11.3:3 | 1:2.0:4.7 | <10 | 65 | 100** |
| Ex. 7 | In (III) isopropoxide | 1:11.3:3 | 1:1.9:2.8 | 20 | 90 | 100** |
| Ex. 8 | Sc (III) oxide | 1:11.3:3 | 1:1.8:6.2 | 40-50 | 125 | 130-140 |
| Ex. 9 | Mn(III) oxide | 1:11.3:1.5 | 1:1.9:3.4 | 20 | 85 | 100 |

**Minimum feed time possible in this experiment; because the reactor pressure never reaches the pressure limit, faster propylene oxide feed rates could be used to obtain significantly shorter times to complete the PO feed.
¹The reactor pressure reaches the upper pressure limit one or more times before rapid polymerization begins.

All of Examples 5-9 exhibit a short activation time and/or shorter time to onset of rapid polymerization. Of particular note are the hafnium-, gallium-, and indium-modified catalysts, all of which not only provide short activation times, but also would permit an even faster propylene oxide feed rate than used in these experiments. In those three cases (as with Examples 1-4 above), the PO feed rate can be ramped up considerably faster than is done in these experiments, which would lead to even faster completion of the PO feed and shorter overall process cycle times.

EXAMPLES 10-12

Examples 10-12 are made in the same manner as Example 1, except the aluminum sec-butoxide in each case is replaced with 33.6 mmol of an M³ metal compound as set forth in Table 4 (only 16.8 mmol in the case of Comp. Sample F and 11.2 mmol in the case of Comp. Sample H). The mole ratio of Co:Zn:M³ metal in the prep and as measured in the catalyst product are indicated in Table 4.

In each case, the catalyst is evaluated in an alternative polyol production process which allows for estimates of activation time and time to onset of rapid PO polymerization.

Dipropylene glycol, (475.4 g) and enough of the catalyst sample (enough to provide 100 parts per million based on the expected mass of the product) are added a 7 L Juchheim reactor at 60° C. and stirred at 50 rpm under dry nitrogen. The reactor is closed and set to 100° C. with stirring. Then, the atmosphere within the reactor is purged with dry nitrogen one or more times. The reactor is then filled with nitrogen to atmospheric pressure (absolute). 77.4 g of propylene oxide are then added to the reactor at the same temperature. This raises the internal reactor pressure to about 3 bar gauge (305 kPa). The pressure inside the reactor is continuously monitored for a pressure drop that indicates catalyst activation has taken place. The time required for the reactor pressure to drop to 1-1.5 bar (101-151 kPa) is noted as the activation time. When the catalyst has activated, 868.8 g of propylene oxide is fed to the reaction at 160° C. The feed rate is increased linearly from zero to up 5 mL/minute over the course of one hour unless the internal pressure during the feed reaches 4.5 bar (456 kPa), in which case the feed rate is reduced until the pressure drops to 4 bar (405 kPa), at which point the feed rate is again increased. After the propylene oxide is completed, the reaction mixture is digested for 15 minutes at 160° C. Vacuum is then is applied to remove any unreacted propylene oxide. The reactor is then cooled to 100° C. and 200 ppm of an antioxidant is added to the reaction mixture under dry nitrogen. Then, the product is cooled to ambient temperature and collected. Batch size is approximately 1422 grams in each case.

Figure 3:
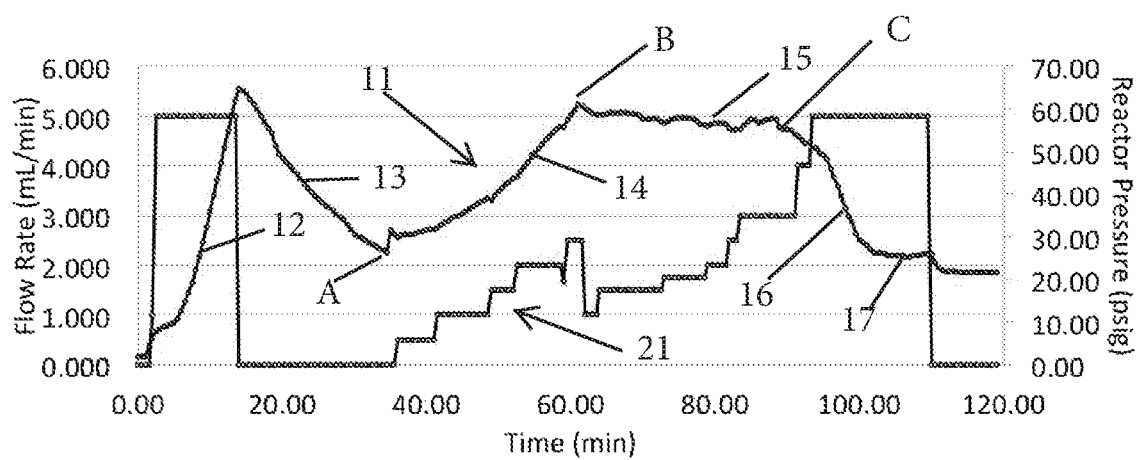
FIG. 3 illustrates a graphical representation of reactor pressure and propylene oxide feed rate vs. time for propylene oxide polymerization using a catalyst complex of the invention (Example 12).

FIG. 3 is a plot (line 11) of reactor pressure vs. time and of propylene oxide feed rate (line 21) for Example 12. Because the polymerization process for Examples 10-12 is performed under nitrogen (rather than under vacuum as in previous examples), the shape of the reactor pressure vs. time curve is somewhat different than described with regard to FIG. 1. Section 12 of line 21 represents the increase in reactor pressure during the initial propylene oxide feed, during which the propylene oxide feed rate is 5 mL/min (segment 22 of line 21). The pressure increases to about 65 psig (448 kPa) during this step. The following slow decrease in reactor pressure indicated in section 13 of line 11 indicates the consumption of propylene oxide as the catalyst activates. The time at which the pressure decreases to 2 bar (202 kPa) is indicated by point A, which is at about 33 minutes after the start of the process. Point A is taken as the catalyst activation time. Segment 14 of line 11 indicates the increase in pressure as the subsequent propylene oxide feed is commenced. As shown by segment 14 of line 11, the reactor pressure increases approximately linearly as the propylene oxide feed rate is ramped step-wise from zero to 2 mL/min over a period of approximately 20 minutes, until the reactor pressure reaches the 4 bar (405 kPa) pressure limit about one hour after the start of the process (point B on line 11). During this period the rate at which propylene oxide is consumed is lower than the feed rate. The feed rate is therefore reduced to a rate that maintains a reactor pressure slightly below the reactor pressure limit; this period corresponds to segment 15 of line 11. During this period of about 20 minutes, the propylene oxide feed rate can be increased only slowly from 1 to 3 mL/min over about 30 minutes. Segment 15 of line 11 indicates that the activity of the catalyst remains sluggish for a period extending to approximately 90 minutes from the start of the process. The onset of rapid polymerization is indicated at point C of line 11, about 90 minutes after the start of the process. After this point, reactor pressure falls even as the propylene oxide feed rate is escalated rapidly to 5 mL/min, as indicated by segment 16 of line 11 (pressure) and segment 26 of line 21 (feed rate). At this point of the reaction and thereafter, propylene oxide is being consumed at rates greater than 5 mL/minute. Note that the reactor pressure indicated in FIG. 3 includes the nitrogen partial pressure, which at the start of the process is only 1 bar (101 kPa) but steadily increases as the reactor fills and the head space volume reduces. The reactor pressure reaches a constant value of about 25 psig (172 kPa) during the period indicated by segment 17 of line 11—this value is almost entirely due to the nitrogen partial pressure, the propylene oxide partial pressure at this point is close to zero. At this point the polymerization rate is such that propylene oxide could be fed a substantially higher rates if so desired. The entire amount of propylene oxide fed is consumed 110 minutes after the start of the process. Segment 18 of line 11 indicates the reactor pressure during the final digestion step after all propylene oxide has been fed to the reactor. This pressure during this stage of the process is almost entire due to the presence of nitrogen in the headspace.

The activation time and time to onset of rapid polymerization are as indicated in Table 4.

TABLE 4

| Desig-nation | $M^3$ Com-pound | Co:Zn:$M^3$ mole ratio, prep | Co:Zn:$M^3$ mole ratio, product | Activation Time, min | Onset of Rapid Polymerization, min |
|---|---|---|---|---|---|
| Ex. 10 | Mo (IV) oxide | 1:11.3:3.3 | 1:1.8:3.8 | 30-40 | 140-160 |
| Ex. 11 | Co (II, III) oxide | 1:11.3:1.1 | 1:0.7:1.0 | ~30 | 100-110 |
| Ex. 12 | W(VI) oxide | 1:11.3:3.3 | 1:2.0:3.2 | 33 | 90 |
| Comp. C* | None | | 1:2:0 | 55 | 180-190 |

*Not an example of this invention.

All of Examples 10-12 demonstrate faster activation and earlier onset of rapid polymerization than does Comp. Sample C.

EXAMPLES 13-19 AND COMPARATIVE SAMPLES D-H

Preparation of zinc hexacyanocobaltate catalyst complex. A mixture of zinc chloride (48.00 grams, 352.1 mmol), tert-butyl alcohol (60 mL), and deionized water (60 mL) are heated to 40° C. in a round-bottomed flask. Aqueous HCl (144 µL, 0.001 M) is added to the flask and the mixture is stirred for 10 minutes are ambient conditions. Next, a solution of potassium hexacyanocobaltate (10.37 grams, 31.2 mmol) premixed with water (80 mL) is added dropwise over a period of 2.5 hours. The mixture is then heated under reflux until a white gel forms (approximately after a period of 20 hours). The resultant gel is dispersed in water (180 mL) and tert-butyl alcohol (180 mL) and then centrifuged (5000 rpm) for 15 minutes. The solvent is decanted and the resultant material is again dispersed in a mixture of water (180 mL) and tert-butyl alcohol (180 mL). The resultant dispersion is heated to 55° C. for 35 minutes and then centrifuged (5000 rpm) for a period of 15 minutes. The resultant material is then washed four times with a 50/50 by volume mixture of distilled water and tert-butyl alcohol and then washed once more with tert-butyl alcohol (180 mL). The washed material is dried under vacuum at 60° C. overnight to a constant pressure (<10 mbar). The resultant dried solid is milled, forming a DMC catalyst sample in the form of a finely divided powder. This is designated Comparative Sample D.

To make Examples 13-19 and Comparative Samples E-H, a one-gram portion of the Comparative Sample D is slurried in a mixture of t-butanol and an $M^3$ metal compound as indicated in Table 5. The amount of Comparative Sample D is enough to provide approximately 0.2 grams, or about 3.39 millimoles, of cobalt. The resulting slurry is again centrifuged, dried as before and milled. The result in each case is a physical mixture of particles of a zinc hexacyanocobaltate complex and particles of the $M^3$ metal compound. Some agglomeration of the two particle types may be present.

Examples 13-19 and Comparative Samples D-H are evaluated for activation time and time to onset of rapid polymerization, using the polymerization method described with regard to Examples 1-4. Results are as indicated in Table 5.

TABLE 5

| Desig-nation | $M^3$ Com-pound | Millimoles $M^3$ compound | Co:$M^3$ metal mole ratio, product | Activation Time, min | Onset of Rapid Polymerization, min |
|---|---|---|---|---|---|
| Ex. 13 | Mo(VI) oxide | | 1:1.9:1.9 | 30-40 | 95 |
| Ex. 14 | Fe(III) oxide | 2.24 | 1:1 | 20-25 | 120 |
| Ex. 15 | V(V) oxide | 4.49 | 1:1.5 | 40 | 130-135 |
| Ex. 16 | MgO | 4.49 | 1:3.9 | 30 | 125 |
| Ex. 17 | Sn(IV) oxide | 4.49 | 1:1.7 | 50 | 180-190 |
| Ex. 18 | ZnO | 4.49 | 1:1.8 | 30 | 180-190 |
| Ex. 19 | NiO | 2.24 | 1:2.1 | 40 | 130 |
| Comp. D* | None | 0 | 1:0 | 55 | 180-190 |
| Comp. E* | Sb(III) oxide | 4.49 | 1:1.2 | 40-50 | 250-300 |
| Comp. F* | CaO | 4.49 | 1:1.6 | Catalyst Does Not Activate | |
| Comp. G* | BaO | 4.49 | 1:1. | Catalyst Does Not Activate | |
| Comp. H* | CuO | 4.49 | 1:2.3 | >300 | >1000 |

Examples 14-19 exhibit shorter activation and/or onset to rapid polymerization times than does Comparative Sample D. Catalyst mixtures containing the antimony, calcium, copper and barium compounds perform even more poorly than the control.

EXAMPLE 20 AND COMPARATIVE SAMPLE I

Comparative Sample I: A 260 molecular weight glycerin propoxylate, (115.6 g) is proproxylated with 84.4 grams of propylene oxide using the general polymerization conditions described in Examples 10-12. The catalyst is 0.3 g of a commercially available zinc hexacyanocobaltate catalyst complex (enough to provide 150 parts per million based on the expected mass of the product). The catalyst does not activate even after 275 minutes.

Example 20 is made performed in the same manner, except that 0.168 g of aluminum oxide having a surface area of about 155 m²/gram is added to the mixture of dipropylene oxide and zinc hexacyancobaltate. The catalyst activates after about 35 minutes, and the onset of rapid polymerization occurs occur even after about 110 minutes. A polyether triol having a molecular weight of about 425 is obtained.

The conditions of Example 20 are even more severe than those of the previous examples because of the use of the trifunctional starter and low equivalent weight (about 140) of the product. The hydroxyl concentration even at the end of the polymerization process is 12%.

EXAMPLE 21

0.046 g of Catalyst Example 3 is suspended in 130.6 g of 700 molecular weight glycerin-initiated polypropylene oxide, sonicated for 120 minutes, and dried under nitrogen for 90 minutes at 130° C. The reactor is then padded four times with $CO_2$ at 70 psig (483 kPa) followed each time by releasing the pressure. The reactor contents are heated to 145° C. and pressurized to 60 psig (414 kPa) with $CO_2$. Then, 14.8 g of PO are added. When the pressure declines back to 60 psig (414 kPa), $CO_2$ is fed to the reactor until the reactor pressure reaches 98 psig (676 kPa), at which time the reactor temperature is taken to 110° C. PO and $CO_2$ are then co-fed to the reactor until the pressure reaches 103 psig (710 kPa). The addition of PO is then continued at a rate of 1 mL per minute. The reactor pressure is controlled in a pressure band spanning 98 to 103 psig (676-710 kPa) by the addition of $CO_2$. This process is maintained until a total of 294 mL of PO are fed to the reactor. Subsequently, the reactor is cooled down to room temperature, the pressure is vented and the reactor is purged with nitrogen.

GPC and IR analyses reveal that the product has number average molecular weight of 2031 g/mol with a polydispersity index of 1.06, and that 96.7 wt % of the product consists of a polyol containing 4.43 wt % $CO_2$, while the remaining 3.3 wt % of the product is propylene carbonate.

The invention claimed is:

1. A method for producing a catalyst complex, the method comprising:
   a) forming a starting solution comprising i) a solvent that includes at least one of water and a liquid aliphatic alcohol, the solvent having dissolved therein ii) a cyanometallate compound having an $M^2$ metal cyanometallate group and iii) a $M^1$ metal salt which reacts with the cyanometallate compound to form a water-insoluble $M^1$ metal cyanometallate, which starting solution further contains 0.01 to 10 moles, per mole of cyanometallate compound, of iii) at least one $M^3$ metal compound different from the $M^1$ metal salt, the $M^3$ metal compound being a compound of a $M^3$ metal selected from one or more of iron, aluminum, hafnium, indium, manganese and gallium, which $M^3$ metal is bonded to at least one alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion, and the $M^3$ metal compound is devoid of halide anions;
   b) reacting the cyanometallate compound and $M^1$ metal salt to form a water-insoluble catalyst complex that includes a $M^1$ metal cyanometallate,
   wherein the $m^1$ metal is selected from $Zn^{2+}$, $Fe^{2+}$, $Co^{+2+}$, $Ni^{2+}$, $Mo^{4+}$, $Mo^{6+}$, $Al^{3+}$, $V^{4+}$, $V^{5+}$, $Sr^{2+}$, $W^{4+}$, $W^{6+}$, $Mn^{2+}$, $Sn^{2+}$, $Sn^{4+}$, $Pb^{2+}$, $Cu^{2+}$, $La^{3+}$, and $Cr^{3+}$; and
   the $M^2$ metal is selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Pd^{2+}$, and $Pt^{2+}$.

2. The process of claim 1 further comprising a step c) of washing the water-insoluble catalyst complex with a wash liquid comprising at least one of water and a liquid complexing agent and a step d) of drying the catalyst complex to form a solid.

3. The process of claim 2, wherein the liquid complexing agent in step c) is selected from the group consisting of a C3-C6 alkanol and a polyether alcohol having a number average molecular weight of up to 8,000 g/mol.

4. The process of claim 1 wherein $M^1$ is zinc and the cyanometallate compound is a hexacyanocobaltate compound.

5. The process of claim 1 wherein the $M^3$ metal compound is selected from the group consisting of (a) a precursor to a $M^3$ metal oxide, which precursor reacts under the conditions of step a) and/or step b) to form an $M^3$ metal oxide and (b) particulate $M^3$ metal oxide.

6. The process of claim 1 wherein the starting solution contains at least 5 moles of water per mole of the $M^3$ metal compound.

7. A method for producing a catalyst complex, the method comprising:
   a) forming a starting solution comprising i) a solvent that includes at least one of water and a liquid aliphatic alcohol, the solvent having dissolved therein ii) a hexacyanometallate compound having an $M^2$ metal cyanometallate group and iii) a zinc metal salt which reacts with the hexacyanometallate compound to form a water-insoluble zinc cyanometallate, which starting solution further contains 0.01 to 10 moles, per mole of hexacyanometallate compound, of iii) at least one $M^3$ metal compound different from the zinc metal salt, the $M^3$ metal compound being a compound of a $M^3$ metal wherein the $M^3$ metal is one or more of aluminum, hafnium, indium, manganese and gallium, which $M^3$ metal is bonded to at least one alkoxide, aryloxy, carboxylate, acyl, pyrophosphate, phosphate, thiophosphate, dithiophosphate, phosphate ester, thiophosphate ester, amide, oxide, siloxide, hydride, carbamate or hydrocarbon anion, and the $M^3$ metal compound is devoid of halide anions;
   b) reacting the cyanometallate compound and $M^1$ metal salt to form a water-insoluble catalyst complex that includes a $M^1$ metal cyanometallate,
   the $M^2$ metal is selected from $Fe^{3+}$, $Fe^{2+}$, $Co^{3+}$, $Co^{2+}$, $Cr^{2+}$, $Cr^{3+}$, $Mn^{2+}$, $Mn^{3+}$, $Ir^{3+}$, $Ni^{2+}$, $Rh^{3+}$, $Ru^{2+}$, $V^{4+}$, $V^{5+}$, $Pd^{2+}$, and $Pt^{2+}$.

8. The process of claim 7 wherein $M^2$ is selected from one or more of $Fe^{3+}$ and $Co^{3+}$.

9. The process of claim 7 further comprising a step c) of washing the water-insoluble catalyst complex with a wash liquid comprising at least one of water and a liquid complexing agent and a step d) of drying the catalyst complex to form a solid.

10. The process of claim 9 wherein the liquid complexing agent in step c) is selected from the group consisting of a C3-C6 alkanol and a polyether alcohol having a number average molecular weight of up to 8,000 g/mol.

11. The process of claim 7 wherein the $M^3$ metal compound is selected from the group consisting of (a) a precursor to a $M^3$ metal oxide, which precursor reacts under the conditions of step a) and/or step b) to form an $M^3$ metal oxide and (b) particulate $M^3$ metal oxide.

12. The process of claim 7 wherein the starting solution contains at least 5 moles of water per mole of the $M^3$ metal compound.

* * * * *